(No Model.)
E. O. VARELL.
FRUIT AND VEGETABLE SCOOP AND KNIFE.
No. 456,784. Patented July 28, 1891.
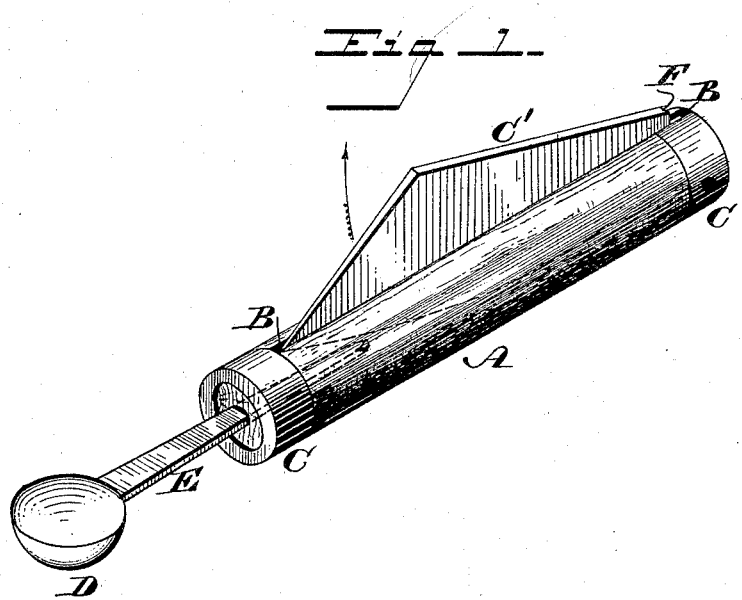
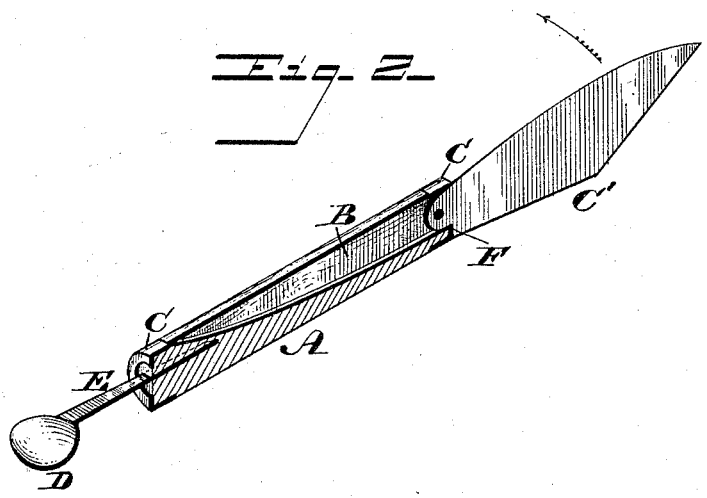
WITNESSES:
L. Douville,
A. P. Jennings.
INVENTOR
Emil O. Varell,
BY John A. Wiedersheim
ATTORNEY.

UNITED STATES PATENT OFFICE.

EMIL O. VARELL, OF PHILADELPHIA, PENNSYLVANIA.

FRUIT AND VEGETABLE SCOOP AND KNIFE.

SPECIFICATION forming part of Letters Patent No. 456,784, dated July 28, 1891.

Application filed September 18, 1890. Serial No. 365,381. (No model.)

*To all whom it may concern:*

Be it known that I, EMIL O. VARELL, a citizen of the United States, residing in the city and county of Philadelphia, State of Pennsylvania, have invented a new and useful Improvement in Fruit and Vegetable Scoops and Knives, which improvement is fully set forth in the following specification and accompanying drawings.

My invention relates to improvements in fruit and vegetable scoops and knives; and it consists of a tool having a wooden handle with a longitudinal kerf therein, a split metallic ring on one end thereof, and a blade adapted to enter a recess in said ring opposite a split thereon and contact with the wall of the same when the blade is opened, as hereinafter more fully set forth.

Figure 1 represents a perspective view of a scoop and knife embodying my invention. Fig. 2 represents a longitudinal section thereof.

Similar letters of reference indicate corresponding parts in the two figures.

Referring to the drawings, A designates a handle made in any suitable form, preferably of wood, and having a longitudinally-extending kerf B therein. Each end of the handle is provided with a sleeve or ring C, whereby the same is prevented from splitting or breaking. At one end of the handle is pivoted the knife-blade C′, and to the other end is secured the scoop D, which consists of a hemispherical hollow bulb made of metal or other suitable material and connected with the handle by the tang or shank E, which is made in such a manner as to easily enter the handle and be firmly secured thereto by suitable means. The scoop may be used to extract the cores from apples, and also in forming shapes, as potato balls, &c.

It is evident that the knife may be opened as desired when the shoulder F thereof abuts against the collar or sleeve B, the back of the blade entering a recess in the edge of the ring, the walls of said recess aiding in bracing the blade.

When the knife is closed, it enters the kerf B, so that its cutting-edge is guarded and inclosed by the kerf, as will be seen in Fig. 1.

The device will be found to be of an inexpensive nature and serviceable for the objects intended.

Having thus described my invention, what I claim as new, and desire to secure by Letters Patent, is—

A tool of the order of a fruit and vegetable scoop and knife, having a wooden handle with a longitudinal kerf therein, a split metallic ring on the end of the said handle, and a knife-blade pivoted in the said end adapted to enter a recess in the said ring opposite the split therein and contact with the said ring when the blade is opened, said parts being combined substantially as described.

EMIL O. VARELL.

Witnesses:
JOHN A. WIEDERSHEIM,
WM. C. WIEDERSHEIM.